United States Patent
Dower

(10) Patent No.: US 7,902,288 B2
(45) Date of Patent: Mar. 8, 2011

(54) SEALANT MATERIALS CONTAINING DIBLOCK COPOLYMERS AND METHODS OF MAKING THEREOF

(75) Inventor: William V. Dower, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 885 days.

(21) Appl. No.: 11/141,137

(22) Filed: May 31, 2005

(65) Prior Publication Data
US 2006/0270785 A1 Nov. 30, 2006

(51) Int. Cl.
*C08L 9/00* (2006.01)
(52) U.S. Cl. .......................... 524/571; 525/240; 525/241
(58) Field of Classification Search .................. 524/571; 525/240, 241
See application file for complete search history.

(56) References Cited

U.S. PATENT DOCUMENTS

| | | | |
|---|---|---|---|
| 3,683,104 A | 8/1972 | Woodland et al. | |
| 3,843,568 A | 10/1974 | Woodland et al. | |
| 3,879,575 A | 4/1975 | Dobbin et al. | |
| 3,897,129 A | 7/1975 | Farrar, Jr. | |
| 4,176,240 A | 11/1979 | Sabia | |
| 4,324,453 A | 4/1982 | Patel | |
| 4,333,706 A | 6/1982 | Davis et al. | |
| 4,351,913 A | 9/1982 | Patel | |
| 4,464,013 A | 8/1984 | Sabia | |
| 4,497,538 A | 2/1985 | Patel | |
| 4,509,821 A | 4/1985 | Stenger | |
| 4,617,422 A | 10/1986 | Hagger | |
| 4,639,483 A | 1/1987 | Billigmeier et al. | |
| 4,701,016 A | 10/1987 | Gartside, III et al. | |
| 4,798,853 A | 1/1989 | Handlin, Jr. | |
| 5,187,763 A | 2/1993 | Tu | |
| 5,262,468 A | 11/1993 | Chen | |
| 5,360,350 A | 11/1994 | Koblitz et al. | |
| 5,541,250 A | 7/1996 | Hudson et al. | |
| 5,657,410 A | 8/1997 | Fehn et al. | |
| 5,741,843 A * | 4/1998 | Koblitz et al. | 524/505 |
| 6,374,023 B1 | 4/2002 | Parris | |
| 2002/0007002 A1* | 1/2002 | Plamthottam | 524/505 |
| 2002/0013402 A1* | 1/2002 | Fisher | 524/543 |
| 2003/0039621 A1* | 2/2003 | Arnaud et al. | 424/63 |
| 2006/0045895 A1* | 3/2006 | Ferrari et al. | 424/401 |

FOREIGN PATENT DOCUMENTS

| | | |
|---|---|---|
| EP | 0 067 009 A1 | 12/1982 |
| EP | 0 299 718 A2 | 1/1989 |
| EP | 0 889 343 A2 | 1/1999 |
| EP | 1 197 971 A1 | 4/2002 |
| WO | WO 93/05113 A1 | 3/1993 |
| WO | WO 01/74480 A1 * | 10/2001 |
| WO | WO 2005/045852 * | 5/2005 |
| WO | WO 2005/045852 A1 | 5/2005 |
| WO | WO 2005045852 A1 * | 5/2005 |

OTHER PUBLICATIONS

Technical Bulletin Shell Chemical Company, SC:1102-89 KRATON® Thermoplastic Rubbers in Oil Gels.
Technical Bulletin Shell Chemical Company, SC:972-87, Kraton® G Rubbers in Clear Sealants.
Technical Bulletin Shell Chemical Company, SC:759-89, Kraton® G 1701 Thermoplastic Rubber.
KRATON® Thermoplastic Rubber 519-86.
Technical Bulletin Shell Chemical Company, SC:72-78, Solution Behavior of KRATON® G Thermoplastic Rubber.
U.S. Application entitled "Filling Materials", filed Jan. 27, 2004, having U.S. Appl. No. 60/539,521.
U.S. Application entitled "Filling Materials", filed Dec. 17, 2004, having U.S. Appl. No. 11/015,047.

* cited by examiner

*Primary Examiner* — Robert D. Harlan
(74) *Attorney, Agent, or Firm* — Melanie G. Gover

(57) ABSTRACT

A method of making a sealant material, such as a grease material, which includes providing a diblock copolymer, where the diblock copolymer includes a plurality of styrene zones and a plurality of rubber zones, and where the styrene zones have a glass transition temperature, and combining the diblock copolymer with mineral oil at a processing temperature less than about the glass transition temperature of the styrene zones. Also disclosed are such sealant and gel materials.

17 Claims, 2 Drawing Sheets

SEALANT MATERIALS CONTAINING DIBLOCK COPOLYMERS AND METHODS OF MAKING THEREOF

FIELD OF THE INVENTION

The present invention relates to grease materials for use in connection points of communication cables. In particular, the present invention relates to grease materials containing diblock copolymers, which are easy to manufacture and are suitable for protecting communication cables against environmental conditions.

BACKGROUND

Communication cables, such as electrical and optical cables, are used in a variety of environmental conditions. For example, communication cables may be placed in humid environments or buried underground. In such applications, the communication cable needs to withstand water penetration because water can severely affect the performance of the cable. For example, in an electrical cable, water may destroy the capacitance balance of the electrical conductor, short circuit the electrical cable, and induce high resistance due to corrosion. Similarly, in an optical cable, water may negatively affect the integrity of the optical cable. This is particularly true at connection points of communication cables (e.g., cable boxes and connectors), which are generally more vulnerable to moisture exposure.

One solution to minimize water penetration at a connection point involves encasing the communication cables at the connection point, and surrounding the connection point with a water insoluble filling material, such as a grease. The grease generally seals the connection point and stops the migration of water. However, conventional greases typically used with communication cables are expensive and time consuming to manufacture and exhibit stability issues over extended periods of time. As such, there exists a need for a grease material that is easy to manufacture and is stable for use at connection points communication cables.

SUMMARY

The present invention is a method of making a sealant material. The method includes providing a diblock copolymer, where the diblock copolymer comprises a plurality of styrene zones and a plurality of rubber zones, and where the styrene zones have a glass transition temperature. The method further includes combining the diblock copolymer with mineral oil at a processing temperature of less than about the glass transition temperature of the styrene zones.

In one embodiment, the present invention is characterized as a method of making a sealant material, which includes providing a styrene-rubber diblock copolymer, filtering the styrene-rubber diblock copolymer to provide a filtered styrene-rubber diblock copolymer having an average particle size of about one millimeter or less, and immersing the filtered styrene-rubber diblock copolymer in mineral oil at a processing temperature of about 80° C. or less.

In another embodiment, the present invention is characterized as a sealant material that includes mineral oil and a styrene-rubber diblock copolymer, where the grease material exhibits a blue tint when substantially free of coloring agents.

In another embodiment, the grease material comprises a gel material.

The above summary of the present invention is not intended to describe each disclosed embodiment or every implementation of the present invention. The figures and the detailed description that follow more particularly exemplify illustrative embodiments.

Unless otherwise explicitly stated, the following definitions apply herein:

References to a singular compound or composition include both singular and plural forms. For example, the term "a styrene-rubber diblock copolymer" refers to one or more styrene-rubber diblock copolymers, and the term "a styrene-rubber-styrene triblock copolymer" refers to one or more styrene-rubber-styrene triblock copolymers.

"Styrene zone" means a styrene-rich region of a block copolymer that contains at least about 66% by weight styrene, based on the entire weight of the region.

"Rubber zone" means a rubber-rich region of a block copolymer that contains at least about 66% by weight rubber, based on the entire weight of the region.

"Cable" means any type of electrical or optical cable for telecommunications or other use, with any number of wires of fibers, from one up to any desired member.

While the above-identified drawings set forth one embodiment of the invention, other embodiments are also contemplated, as noted in the discussion. In all cases, this disclosure presents the invention by way of representation and not limitation. It should be understood that numerous other modifications and embodiments may be devised by those skilled in the art, which fall within the scope and spirit of the principles of the invention. The figures may not be drawn to scale. Like reference numbers have been used throughout the figures to denote like parts.

DETAILED DESCRIPTION

Figure 1:
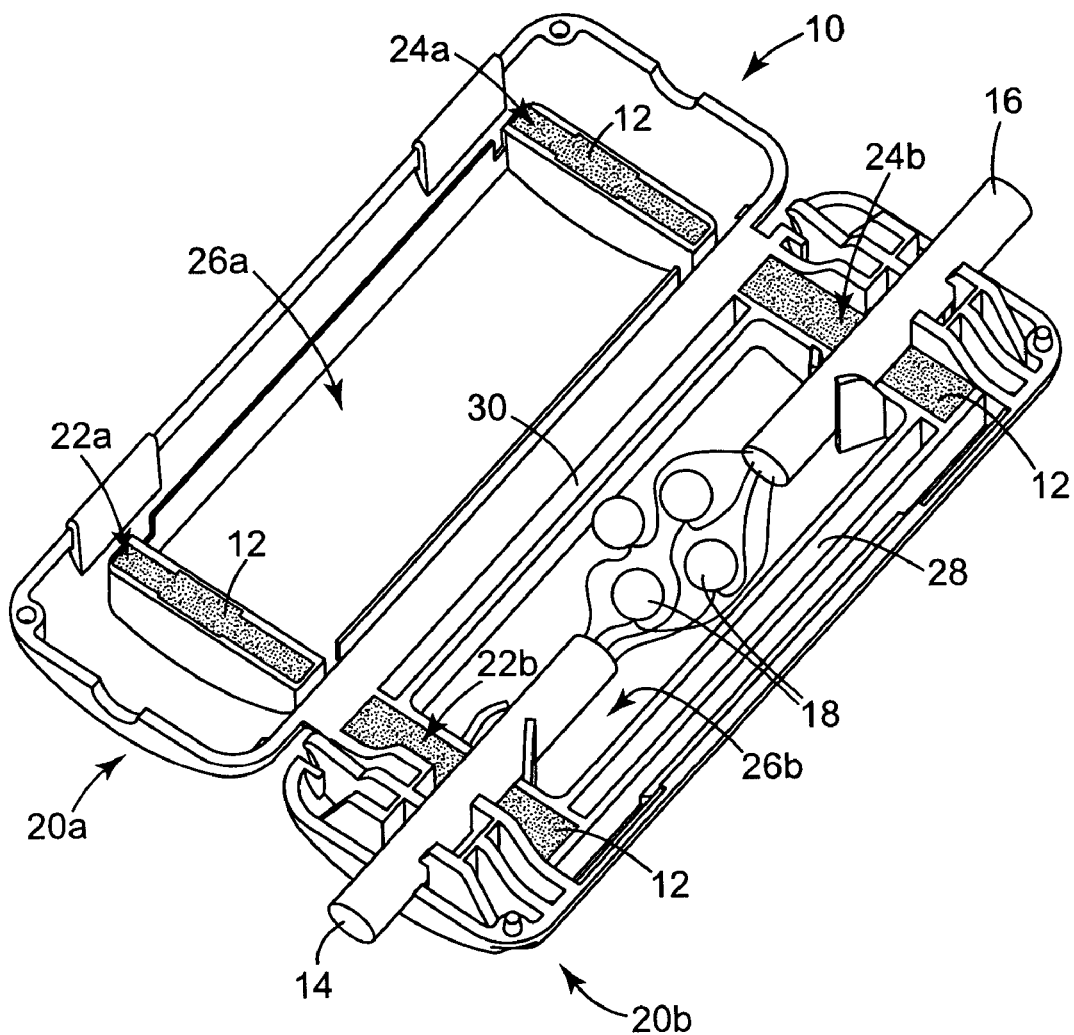
FIG. 1 is a perspective view of a cable box in use with grease material of the present invention and a pair of spliced cables.

FIG. 1 is a perspective view of cable box 10 in use with sealant material 12, which may comprise a grease material 12, of the present invention, spliced cables 14 and 16, and discrete connectors 18. Cable box 10 is an example of a suitable enclosable container for use with grease material 12. As shown, cable box 10 includes cover members 20a and 20b, which are capable of being placed against each other to enclose the internal portions of cable box 10. Cover member 20a includes a pair of containment cavities 22a and 24a located at the distal ends of cover member 20a, and a main cavity 26a disposed between containment cavities 22a and 24a. Similarly, cover member 20b includes a pair of containment cavities 22b and 24b located at the distal ends of cover member 20b, a main cavity 26b disposed between containment cavities 22b and 24b, and lateral slots 28 and 30.

Spliced cables 14 and 16 extend through the distal ends of cover member 20b, and are connected with discrete connectors 18. Grease material 12 of the present invention is disposed in each of containment cavities 22a, 22b, 24a, and 24b. As such, when cover members 20a and 20b are closed together, grease material 12 seals spliced cables 14 and 16 within cable box 10. This protects the connections between spliced cables 14 and 16 at discrete connectors 18 from external environmental conditions, such as moisture.

Grease material 12 compositionally includes mineral oil and a styrene-rubber diblock copolymer, where the diblock copolymer substantially retains significant amounts of rubber chain cross-linking between separate styrene zones of the diblock copolymer (herein referred to as a "physically cross-linked structure"), which is originally provided by the manufacturer. The physically cross-linked structure of the diblock copolymer allows grease material 12 to exhibit good resistance to slumping, even at elevated temperatures. Slumping is an identifying characteristic that a given grease will eventually flow to attain the lowest potential energy state. Slumping and flowing are undesirable traits of grease, especially when used at connection points of communication cables (e.g., cable box 10). This is because the grease may eventually displace from its original position, thereby exposing the underlying surfaces to external environmental conditions, such as moisture. Grease material 12 of the present invention, however, exhibits good resistance to slumping and does not flow from its original position, even when subjected to temperatures up to or over about 80° C. As such, grease material 12 may continuously provide protection against external environmental conditions over extended periods of time.

The physically cross-linked structure of the diblock copolymer is retained by forming grease material 12 at a low processing temperature and/or with shear mixing. The cross-linked structure of the diblock copolymer is temperature and shear dependent. While not wishing to be bound by theory, it is believed that when a styrene-containing diblock copolymer is heated above the glass transition temperature of the styrene zones, the styrene-rich regions of the diblock copolymer reorder and reduce in size. This degrades the rubber chain entanglements and the cross-linked structure. As the cross-linked structure is reduced, the physical cross-linking is correspondingly reduced. This reduces the mechanical strength and resistance to slumping of the resulting grease. Moreover, if the process combines shear mixing with heating above the glass transition temperature of the styrene zones, substantially all of the original cross-linked structure is lost. As such, the resulting grease behaves as a viscous liquid, which flows over time, even at room temperature.

Grease material 12, however, is formed at a processing temperature maintained at less than about the glass transition temperature of the styrene zones of the diblock copolymer, which is generally about 100° C. As such, the diblock copolymer of grease material 12 retains the physically cross-linked structure. Suitable processing temperatures for forming grease material 12 include temperatures of about 80° C. or less, particularly suitable processing temperatures for forming grease material 12 include temperatures of about 50° C. or less, and even more particularly suitable processing temperatures for forming grease material 12 include temperatures of about 30° C. or less. The processing temperature may be maintained at the above-listed temperatures in variety of manners. For example, the mineral oil may be heated to a desired above-listed temperature and maintained while the diblock copolymer and the mineral oil are combined. Alternatively, if the processing temperature is room temperature (i.e., about 25° C.), no heating is required, and the diblock copolymer and the mineral oil may be combined at ambient conditions.

As discussed above, the degree of physical cross-linking of the diblock copolymer is temperature and shear dependent. As such, the amount of shear mixing that may be used to form grease material 12 is inversely proportional to the processing temperature. When the processing temperatures range from about 50° C. to about 80° C., suitable shear mixing levels for forming grease material 12 include low shear levels or less (e.g., no mixing). When the processing temperatures are less than about 50° C., suitable shear mixing levels for forming grease material 12 include moderate shear levels or less. Examples of moderate shear levels include those produced with propeller or hand paddle mixing, and are sufficient to wet the diblock copolymer particles and distribute them within the mineral oil. This allows grease material 12 to be processed with inexpensive equipment, which reduces processing costs.

Grease material 12 is formed by absorbing the mineral oil in the rubber zones of the diblock copolymer without substantially disrupting the styrene zones of the diblock copolymer. This may be accomplished by combining particles of the diblock copolymer with the mineral oil at the suitable processing temperature and/or with shear mixing, as discussed above. The diblock copolymer desirably exhibits a small average particle size to increase the effective surface area in contact with the mineral oil, thereby increasing the rate of absorption. A suitable maximum average particle size for the diblock copolymer prior to combining with the mineral oil is about one millimeter. A particularly suitable maximum average particle size for the diblock copolymer prior to combining with the mineral oil is about 0.5 millimeters.

The diblock copolymer is typically purchased as rubbery agglomerate crumbs, which may be readily broken apart to reduce the average particle size of the diblock copolymer. This may be accomplished in a variety of manners. For example, the diblock copolymer may be filtered, in which, as defined herein, the dry diblock copolymer is sifted and pressed through a screen having orifices corresponding to the desired particle sizes. An example of a suitable screen includes a metal screen with a 5.5 wire/centimeter (14-wire/inch) mesh, with 0.023-centimeter (0.009-inch) diameter wires, and which is commercially available from Sefar America, Lumberton, N.J. The screen may be positioned over the mineral oil, which allows the filtered diblock copolymer particles to fall and immerse directly into the mineral oil.

The diblock copolymer is also desirably charged to the mineral oil quickly enough so the mineral oil absorbs into the diblock copolymer particles in a substantially uniform manner. This reduces the tendency of the diblock copolymer particles from forming agglomerates. Suitable times for charging the diblock copolymer into the mineral oil include about twenty minutes or less, particularly suitable times for charging the diblock copolymer into the mineral oil include about ten minutes or less, and even more particularly suitable times for charging the diblock copolymer into the mineral oil include about five minutes or less. Portions of the diblock copolymer may be charged continuously or in separate intervals over the given times. If agglomerates of the diblock copolymer particles are formed at the surface of the mineral oil, the agglomerates may be reduced by mixing.

As the diblock copolymer and the mineral oil are combined, the rubber zones of the diblock copolymer absorb the mineral oil until a saturation point is substantially reached. The time required for the rubber zones to become substantially saturated with the mineral oil depends on the temperature of the process and the amount of shear mixing that is applied. As the rubber zones absorb the mineral oil, the viscosity of the resulting mixture increases. As such, an increase in temperature will decrease the time required to form grease material 12.

After the rubber zones of the diblock copolymer are substantially saturated with the mineral oil, the resulting grease material 12 appears as a gelatinous material with a visually discernable non-uniform character (i.e., numerous sticky globules that adhere to each other). Additionally, air bubbles may be visually discernable within grease material 12. The air bubbles are believed to result from air that originates in the diblock copolymer particles, and which is expelled as the rubber zones of the diblock copolymer absorb the mineral oil. The air bubbles may be subsequently removed from grease material 12 by placing grease material 12 under vacuum conditions. If removal of the air bubbles is desired, grease material 12 may be placed under vacuum conditions soon after the diblock copolymer particles are dispersed in the mineral oil. This allows the air to be removed before grease material 12 forms a cohesive mass. The resulting grease material 12 is suitable for use as a grease sealant, and is resistant to slumping, even at elevated temperatures. In one embodiment of the present invention, grease material 12 exhibits substantially no slump when exposed to a temperature of about 80° C. or less when tested pursuant to the Slump Test, discussed below.

Another characteristic of grease material 12 is that, after formation, grease material 12 exhibits a blue tint to an unaided human eye at ambient lighting, without the use of coloring agents. Coloring agents are defined herein as any composition, other than the mineral oil or the diblock copolymer, that affects the color of grease material 12 when incorporated. The blue tint is believed to be due to light scattering off of the styrene-rich regions of the diblock copolymer. In contrast, conventional greases that are formed at processing temperatures at or above the glass transition temperature of the styrene zones of the diblock copolymer are clear, and do not exhibit a blue tint. As discussed above, exposure of the diblock copolymer to high temperatures is believed to cause the styrene-rich regions of the diblock copolymer reorder and reduce in size. The reduced sizes of the styrene-rich regions correspondingly eliminate visible light scattering. In one embodiment of the present invention, grease material 12 exhibits a blue tint when tested pursuant to the Copolymer Structure Degradation Test, discussed below.

Suitable mineral oils for use in grease material 12 include petroleum distillate hydrocarbon oils, such as paraffinic mineral oils, naphthenic mineral oils, and combinations thereof. Naphthenic mineral oils contain naphthene groups (i.e., cycloparaffin) and are greater than 35% by weight naphthenic and less than 65% by weight paraffinic, according to ASTM D2501-00. Paraffinic mineral oils contain less than 35% by weight naphthenic and greater than 65% by weight paraffinic. Examples of suitable commercially available mineral oils include trade designated "KAYDOL" White Mineral Oil and trade designated "SEMTOL 40" White Mineral Oil, both commercially available from Crompton Corporation, Middlebury, Conn. A suitable minimum concentration of the mineral oil in grease material 12 is about 50% by weight, based on the entire weight of grease material 12. A suitable maximum concentration of the mineral oil in grease material 12 is about 96% by weight, based on the entire weight of grease material 12.

Suitable styrene-rubber diblock copolymers for use in grease material 12 include styrene-isoprene, styrene-polybutadiene, styrene-ethylene/butylene, styrene-ethylene/propylene, and combinations thereof. Examples of suitable commercially available diblock copolymers include trade designated "KRATON G1701" and "KRATON G1702" Block Copolymers, both of which are commercially available from Kraton Polymers, Houston, Tex.; and "SEPTON S1020" Block Copolymer commercially available from Septon Company of America, Pasadena, Tex. A suitable minimum concentration of the diblock copolymer in grease material 12 is about 4% by weight, based on the entire weight of grease material 12. A suitable maximum concentration of the diblock copolymer in grease material 12 is about 15% by weight, based on the entire weight of grease material 12.

The diblock copolymers and mineral oil used in the present invention have similar coefficients of thermal expansion. As such, grease material 12 does not exhibit oil weeping when used at elevated temperatures. Many conventional greases use rheological-modifying agents and oils that have significantly different coefficients of thermal expansion. As such, when the conventional greases are heated in warm environments, the oil separates from the rheological-modifying agents (i.e., weeps). This results in an oily residue on the surface of the conventional grease, which is undesirable.

Grease material 12 of the present invention may also include additional components, such as stabilizers, antioxidants, processing aids, styrene-rubber-styrene triblock copolymers, microspheres, silica gels, and combinations thereof.

Suitable stabilizers and antioxidants include phenols, phosphites, phosphorites, thiosynergists, amines, benzoates, and combinations thereof. Suitable commercially available phenolic-based antioxidants include trade designated "IRGANOX 1035", "IRGANOX 1010", and "IRGANOX 1076" Antioxidants and Heat Stabilizers for wire and cable applications, from Ciba Specialty Chemicals Corp., Tarrytown, N.Y. A suitable maximum concentration of stabilizers or antioxidants in grease material 12 is about 1% by weight, based on the entire weight of grease material 12. When forming grease material 12, stabilizers and antioxidants may be dissolved or dispersed in the mineral oil prior to combining the diblock copolymer with the mineral oil.

Suitable styrene-rubber-styrene triblock copolymers for use in sealant material 12 include styrene-butadiene-styrene (SBS), styrene-isoprene-styrene (SIS), styrene-ethylene/butylene-styrene (SEBS), styrene-ethylene/propylene-styrene (SEPS), and combinations thereof. Examples of suitable SEBS block copolymers for use in sealant material 12 include trade designated "KRATON G-1650" and "KRATON G-1652" Block Copolymers, both of which are commercially available from Kraton Polymers, Houston, Tex. Additionally, suitable styrene-rubber-styrene triblock copolymers for use in sealant material 12 also include styrene-rubber-styrene triblock copolymers that are included as additives in some commercially available styrene-rubber diblock copolymers. A suitable maximum concentration of the styrene-rubber-styrene triblock copolymer in sealant material 12 includes a concentration ratio of about 1:2, by weight, relative to the styrene-rubber diblock copolymer. The styrene-rubber-styrene triblock copolymer may be mixed with the mineral oil along with the diblock copolymer.

Suitable microspheres for use in grease material 12 include functionalized and non-functionalized hollow glass and plastic microspheres. Suitable hollow glass microspheres have average particle sizes, by volume and at effective top size (95%), of about 10 micrometers to about 140 micrometers, and true densities of about 0.1 grams/cubic centimeter ($g/cm^3$) to about 0.4 $g/cm^3$. The term "true density" is a concentration of matter, as measured by weight per unit volume. Such hollow glass microspheres contain a large volume fraction of air (e.g., on the order of 90% to 95% air), and exhibit a dielectric constant of about 1.0. As such, hollow glass microspheres reduce the overall dielectric constant of grease material 12.

Examples of suitable commercially available hollow glass microspheres for use in grease material 12 include the S Series, K Series, and A Series of trade designated "3M SCOTCHLITE" Glass Bubbles from 3M Company, St. Paul, Minn. Examples of particularly suitable 3M SCOTCHLITE Glass Bubbles include 3M SCOTCHLITE K1 Glass Bubbles (true density of 0.125 g/cm$^3$), 3M SCOTCHLITE K15 Glass Bubbles (true density of 0.15 g/cm$^3$), 3M SCOTCHLITE A16 Glass Bubbles (true density of 0.16 g/cm$^3$), 3M SCOTCHLITE K20 Glass Bubbles (true density of 0.20 g/cm$^3$), 3M SCOTCHLITE S22 Glass Bubbles (true density of 0.22 g/cm$^3$), and combinations thereof. A suitable maximum concentration of microspheres in grease material 12 is about 20% by weight, based on the entire weight of grease material 12. When forming grease material 12, microspheres may be charged to the mineral oil before, after, or currently with combining the diblock copolymer with the mineral oil.

In one embodiment of the present invention, grease material 12 is substantially free of petroleum waxes, such as paraffin wax, which are solids at 25° C. Petroleum waxes that exhibit melting points high enough to allow them to contribute to slump resistance typically require high processing temperatures (e.g., 110° C. or greater). Such temperatures are generally greater than the glass transition temperature of the styrene zones of the diblock copolymer. As discussed above, this would reduce the cross-linked structure of the diblock copolymer. Nonetheless, grease material 12 exhibits good resistance to slumping without requiring the use of petroleum waxes.

While shown in use with containment cavities 22a, 22b, 24a, and 24b of cable box 10 in FIG. 1, grease material 12 may also be used in a wide variety of applications, such as electrical, opto-electrical (i.e., a combination of optical and electronic components), and optical applications. For example, grease material 12 may also be disposed within discrete connectors 18, main cavities 26a and 26b, and lateral slots 28 and 30. This provides additional protection to spliced cables 14 and 16. Additional applications include cables, connectors (e.g., discrete connectors, modular connectors, connector boxes, and grease boxes), and closures (e.g., drop wire closures, filled closures, buried closures, and terminal blocks). An example of a particularly suitable application includes an electrical connector disclosed in Farrar, Jr., U.S. Pat. No. 3,897,129.

Figure 2A:
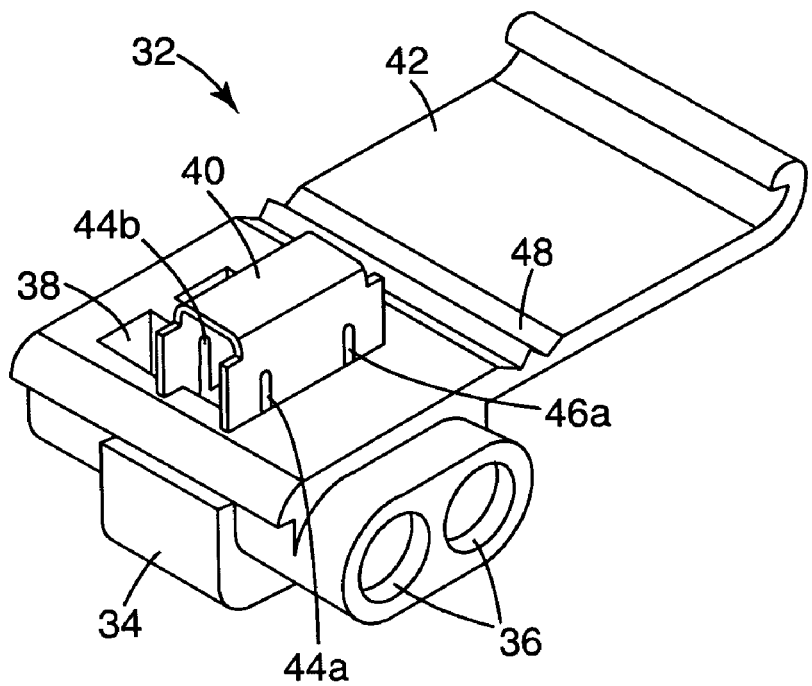
FIG. 2A is a perspective view of a dropwire connector in use with grease material of the present invention.
Figure 2B:
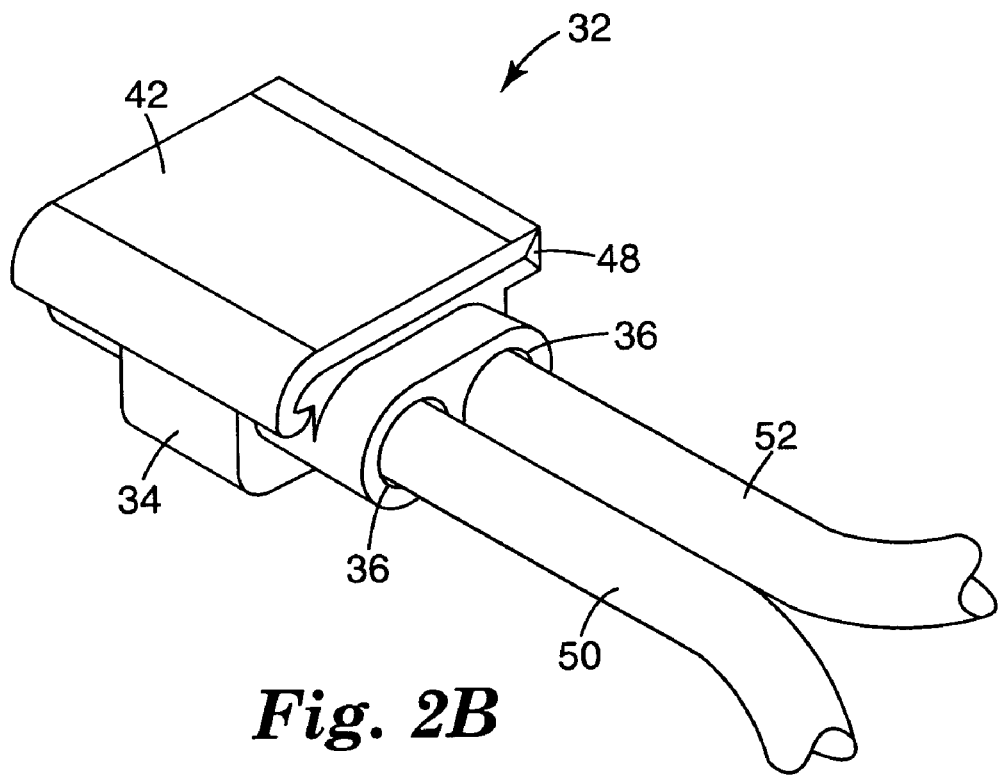
FIG. 2B is a perspective view of the dropwire connector in use with grease material of the present invention and a pair of wires.

FIGS. 2A and 2B are perspective views of dropwire connector 32 in use with grease material 12 of the present invention (not shown in FIG. 2A or 2B). Dropwire connector 32 is an example of a particularly suitable enclosable container for use with grease material 12. As shown in FIG. 2A, dropwire connector 32 includes connector body 34, wire openings 36, body cavity 38, U-contact 40, and lid 42. Wire openings 36 and body cavity 38 extend within connector body 34, and are substantially filled with grease material 12. U-contact is disposed in body cavity 38, and includes slits 44a and 44b and slits 46a and 46b (slit 46b not shown in FIG. 2A). Lid 42 connects to body cavity 38 via living hinge 48.

FIG. 2B shows dropwire connector 32 in use with wires 50 and 52. During use, wires 50 and 52 may be inserted in wire openings 36, such that the tips of wires 50 and 52 extend within body cavity 38. This allows grease material 12 to extend around the tips of wires 50 and 52, and into wire openings 36. U-contact 40 may then be crimped (i.e., pressed down into body cavity 38), which causes wires 50 and 52 to be inserted through slits 44a and 44b and slits 46a and 46b, respectively. The crimping also strips portions of the insulating layers of wires 50 and 52, and creates an electrical contact between wires 50 and 52. Lid 42 may then be closed and secured against connector body 34, thereby enclosing body cavity 38. Grease material 12 effectively plugs wire openings 36 and body cavity 38 from external environmental conditions, which protects the connection between wires 50 and 52 against moisture.

PROPERTY ANALYSIS AND
CHARACTERIZATION PROCEDURES

Various analytical techniques are available for characterizing the grease materials of the present invention. Several of the analytical techniques are employed herein. An explanation of these analytical techniques follows.

Slump Test

Grease materials of the present invention were qualitatively measured pursuant to the following procedure to determine which at temperatures the grease materials could continue to exhibit resistance to slumping. The following procedure involves subjecting the grease materials to various temperatures after forming the grease materials. It does not involve varying the processing temperatures for forming the grease materials.

A 4-gram sample of the grease material was spread into a 2.54-centimeter (1.00-inch) wide by 0.64-centimeter (0.25-inch) high ointment tin. The tin was then placed in an oven at the desired temperature for a one hour period. After the one hour period, the tin was removed from the oven and allowed to rest at 25° C. for one hour to cool. The tin was then tilted to a vertical orientation, and remained in the vertical orientation for 48 hours. After the 48 hour period, the amount that the grease material moved from its original position was visually examined and ranked on a scale of 1-4. Table 1 provides the scale rankings and their corresponding criteria.

TABLE 1

| Scale | Criteria |
|---|---|
| 1 | Severe slumping. The grease material forms a horizontal surface and flows out the tin at 25° C. |
| 2 | Moderate slumping. Noticeable flow of the grease material, but the grease material does not form a horizontal surface. |
| 3 | Minor slumping. The surface of the grease material is smoother than originally, but large features remain. |
| 4 | No slumping. Fine features of the grease material remain. |

The temperatures that the grease materials were subjected to varied from 25° C. to 200° C.

Copolymer Structure Degradation Test

Grease materials of the present invention were qualitatively measured pursuant to the following procedure to determine the extent of degradation of the cross-linked structure of the diblock copolymer. As discussed above, grease materials that retain physically cross-linked structures of the diblock copolymer exhibit a blue tint due to light scattering off of the styrene-rich regions of the diblock copolymer. However, if the cross-linked structure of the diblock copolymer degrades, such as when the grease materials are heated near or above the glass transition temperature of the styrene zones of the diblock copolymer, the blue tint disappears. As such, whether or not a grease material exhibits a blue tint is indicative of whether or not the grease material was subjected to high temperatures when formed, or subsequently.

A 250-gram sample of the grease material was visually examined in a clear 16-ounce jar to see whether or not the grease material exhibited a blue tint to an unaided human eye at ambient lighting. The presence of a blue tint (when the grease material is substantially free of coloring agents) is evidence that the grease material was not formed at processing temperatures near or above the glass transition temperature of the styrene zones of the diblock copolymer. The sample size used in this test provides an adequate amount of grease material to provide the blue tint, if present. Smaller sample sizes may not exhibit the blue tint due to the smaller amounts of light scattering. This effect is similar to the light scattering of water (i.e., a small cup of water appears clear, while a large lake of water appears blue).

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

The following compositional abbreviations are used in the following Examples:

"Kaydol oil": Mineral oil commercially available under the trade designation "KAYDOL" White Mineral Oil from Crompton Corporation, Middlebury, Conn.

"G1701": A styrene-rubber diblock copolymer commercially available under the trade designation "KRATON G1701" Block Copolymer from Kraton Polymers, Houston, Tex.

"G1702": A styrene-rubber diblock copolymer commercially available under the trade designation "KRATON G1702" Block Copolymer from Kraton Polymers, Houston, Tex.

"S1020": A styrene-rubber diblock copolymer commercially available under the trade designation "SEPTON S1020" Block Copolymer from Septon Company of America, Pasadena, Tex.

"Irganox": An antioxidant commercially available under the trade designation "IRGANOX 1010" Antioxidant from Ciba Specialty Chemicals Corp., Tarrytown, N.Y.

Examples 1-7

Each grease material of Examples 1-7 was formed pursuant to the following procedure. Table 2 provides the amounts of the mineral oil and the diblock copolymer used for each Example, and the weight percent of the diblock copolymer in the grease material.

TABLE 2

| Example | Diblock Copolymer | Percent by Weight of the Diblock Copolymer | Diblock Copolymer (grams) | Mineral Oil (grams) |
|---|---|---|---|---|
| Example 1 | G1702 | 6.0% | 15 | 235 |
| Example 2 | G1702 | 8.0% | 20 | 230 |
| Example 3 | G1702 | 10.0% | 25 | 225 |
| Example 4 | G1701 | 10.0% | 25 | 225 |
| Example 5 | S1020 | 10.0% | 25 | 225 |
| Example 6 | G1701 | 12.5% | 31 | 219 |
| Example 7 | S1020 | 12.5% | 31 | 219 |

The given amount of Kaydol oil was poured into a 16-ounce jar and continually mixed. The mixing was performed at 500 rotations-per-minute with a three-bladed steel propeller and a Model 2AM-NCC-16 air motor from Gast Manufacturing Corp., Benton Harbor, Mich. The Kaydol oil was mildly heated and 0.2% by weight (based on the entire weight of the grease material) of Irganox antioxidant was dissolved in the Kaydol oil. The processing temperature was then reduced to, and maintained at 25° C. (i.e., no heating) and atmospheric pressure. The diblock copolymer was then filtered and charged to the jar in a five minute period. The diblock copolymer was filtered with a 5.5-wire/centimeter mesh screen having an orifice diameter of 0.157 centimeters (0.062 inches). The screen was placed over the jar so that the diblock copolymer fell directly into the mixing mineral oil.

The mineral oil and diblock copolymer were then mixed in the jar at 25° C. and atmospheric pressure for an additional five minutes at the same mixing speed. After the five minute period, the mixing was stopped and the jar containing the resulting grease material was placed in a vacuum maintained at 30 mmHg until the grease material foamed. The jar was then removed from the vacuum and the grease material was allowed to rest at 25° C. and atmospheric pressure for 12 hours. The grease material was then visually examined pursuant to the Copolymer Structure Degradation Test, discussed above. After formation, each of the grease materials of Examples 1-7 exhibited a blue tint. As such, the grease materials retained physically cross-linked structures of their diblock copolymers after formation.

Slump Testing for Examples 1-7

After formation, the grease materials of Examples 1-7 were tested pursuant to the Slump Test, discussed above. Tables 3 and 4 provide the scaled rankings of the amounts of slumping the grease materials exhibited.

TABLE 3

| Example | 25° C. | 80° C. | 100° C. | 120° C. |
|---|---|---|---|---|
| Example 1 | 4 (none) | 3 (minor) | 3 (minor) | 3 (minor) |
| Example 2 | 4 (none) | 3 (minor) | 3 (minor) | 3 (minor) |
| Example 3 | 4 (none) | — | 4 (none) | 3 (minor) |
| Example 4 | 4 (none) | — | 4 (none) | 4 (none) |
| Example 5 | 4 (none) | — | 4 (none) | 4 (none) |
| Example 6 | 4 (none) | — | 4 (none) | 4 (none) |
| Example 7 | 4 (none) | — | 4 (none) | 4 (none) |

TABLE 4

| Example | 140° C. | 160° C. | 180° C. | 200° C. |
|---|---|---|---|---|
| Example 1 | 3 (minor) | 1 (severe) | 1 (severe) | 1 (severe) |
| Example 2 | 3 (minor) | 2 (moderate) | 1 (severe) | 1 (severe) |
| Example 3 | 3 (minor) | 3 (minor) | 1 (severe) | 1 (severe) |
| Example 4 | 3 (minor) | 3 (minor) | 3 (minor) | 2 (moderate) |
| Example 5 | 4 (none) | 2 (moderate) | 2 (moderate) | — |
| Example 6 | 4 (none) | 4 (none) | 3 (minor) | 2 (moderate) |
| Example 7 | 4 (none) | 4 (none) | 2-3 (minor-moderate) | 1 (severe) |

The data provided in Tables 3 and 4 show that the grease materials of Examples 1-7 exhibited good resistance to slumping, even at elevated temperatures. In particular, between 25° C. and 100° C., the grease materials showed little or no slumping. As such, the grease materials of the present invention substantially retain their original positions to protect underlying surfaces from external environmental conditions, such as moisture.

The data also show that the resistance to slumping at elevated temperatures depends on the concentration of the diblock copolymer in the grease material. In fact, the grease materials of Examples 5-7, which had diblock copolymer concentrations of 10% and 12.5%, by weight, showed good resistance to slumping when exposed to temperatures of 140° C. to 160° C. Nonetheless, the grease materials of Examples 1 and 2, which had diblock polymer concentrations of 6% and 8%, by weight, showed adequate resistance to slumping up to even 140° C.

Copolymer Structure Degradation Testing for Examples 1-7

After the Slump testing, the grease materials of Examples 1-7 were visually examined again pursuant to the Copolymer Structure Degradation Test, discussed above. The grease materials of Examples 1-7 that remained at 25° C., and the grease materials of Examples 1 and 2 that were exposed to the 80° C. environment, each exhibited a blue tint. As such the grease materials of the present invention are particularly suitable for uses at these temperatures. The grease materials of Examples 3-7 were not tested at 80° C. However, due to the higher concentrations of diblock copolymer in the grease materials of Examples 3-7, it is believed that such grease materials would also have exhibited a blue tint.

The grease materials of Examples 1-7 that were exposed to the 100° C. to the 200° C. environments were clear, and did not exhibit a blue tint. This correlates to the lower resistances to slumping for these grease materials, as discussed above. While these results relate to grease materials that have already been formed at 25° C., they are indicative of how heating grease materials to temperatures above the glass transition temperatures of the styrene zones of the diblock copolymers affects the resistance to slumping and flowing. Conventional grease materials that are heated to such temperatures exhibit reduced resistance to slumping, even at 25° C. In contrast, the grease materials of the present invention exhibit good resistance at 25° C., and even at elevated temperatures.

Modified Slump Testing for Examples 1-7

The grease materials of Examples 1-7 were also subjected to a modified Slump Test. In this test, after each tin was removed from the oven and allowed to rest at 25° C. for one hour to cool, the tin was then tilted to a vertical orientation, and remained in the vertical orientation for four days (rather than 48 hours). Any grease materials that exhibited slump at this point were removed from the remainder of this test. The tins with the remaining grease materials were then placed in a 70° C. oven and in an 80° C. oven for one hour at a vertical orientation.

After the one hour period, the samples were removed from the oven, cooled, and observed. The amount that the grease material moved from its original position was visually examined and ranked on the scale of 1-4, discussed above in the Slump Test. Table 5 provides the scaled rankings of the amounts of slumping the grease materials exhibited when exposed to the 70° C. environment. Table 6 provides the scaled rankings of the amounts of slumping the grease materials exhibited when exposed to the 80° C. environment.

TABLE 5

| Example | 80° C. | 100° C. | 120° C. | 140° C. | 160° C. |
|---|---|---|---|---|---|
| Example 1 | 4 (none) | N/T | N/T | N/T | N/T |
| Example 2 | 4 (none) | N/T | N/T | N/T | N/T |
| Example 3 | 4 (none) | 4 (none) | N/T | N/T | N/T |
| Example 4 | 4 (none) | 4 (none) | 4 (none) | 3 (minor) | N/T |
| Example 5 | 4 (none) | 4 (none) | 4 (none) | 4 (none) | N/T |
| Example 6 | 4 (none) | 4 (none) | 4 (none) | 4 (none) | 4 (none) |
| Example 7 | 4 (none) | 4 (none) | 4 (none) | 4 (none) | 4 (none) |

(N/T) = Not tested

TABLE 6

| Example | 80° C. | 100° C. | 120° C. | 140° C. | 160° C. |
|---|---|---|---|---|---|
| Example 1 | 3 (minor) | N/T | N/T | N/T | N/T |
| Example 2 | 3 (minor) | N/T | N/T | N/T | N/T |
| Example 3 | 4 (none) | 4 (none) | N/T | N/T | N/T |
| Example 4 | 4 (none) | 4 (none) | 4 (none) | 3 (minor) | N/T |
| Example 5 | 4 (none) | 4 (none) | 4 (none) | 4 (none) | N/T |
| Example 6 | 4 (none) | 4 (none) | 4 (none) | 4 (none) | 4 (none) |
| Example 7 | 4 (none) | 4 (none) | 4 (none) | 4 (none) | 4 (none) |

(N/T) = Not tested

The data provided in Tables 5 and 6 show that the grease materials of Examples 1-7 exhibited good resistance to slumping even while being subjected to temperatures of 70° C. and 80° C. As such, the grease materials of the present invention substantially retain their original positions even when used in environments with elevated temperatures.

Although the present invention has been described with reference to preferred embodiments, workers skilled in the art will recognize that changes may be made in form and detail without departing from the spirit and scope of the invention.

The invention claimed is:

1. A method of making a sealant material, the method comprising:
    providing a diblock copolymer, wherein the diblock copolymer comprises a plurality of styrene zones and a plurality of rubber zones, wherein the rubber chains are physically crosslinked between the styrene zones and wherein the styrene zones have a glass transition temperature; and
    combining the diblock copolymer with mineral oil without the addition of water or volatile solvents at a processing temperature of less than about the glass transition temperature of the styrene zones, wherein the mineral oil absorbs into the rubber zones of the diblock copolymer and comprises an amount of at least 50% by weight of the sealant material, wherein the processing temperature is maintained at about 80° C. or less such that the physical crosslinking of the diblock copolymer is retained, and wherein the resulting sealant material is substantially free of petroleum wax, water, and volatile solvents.

2. The method of claim 1, and further comprising filtering the diblock copolymer to provide a filtered diblock copolymer with an average particle size of about one millimeter or less prior to the combining with the mineral oil.

3. The method of claim 1, wherein the processing temperature is about 50° C. or less.

4. The method of claim 1, wherein the processing temperature is about 30° C. or less.

5. The method of claim 4, and further comprising mixing the diblock copolymer and the mineral oil.

6. The method of claim 1, wherein the diblock copolymer is selected from a group consisting of styrene-isoprene, styrene-polybutadiene, styrene-ethylene/butylene, styrene-ethylene/propylene, and combinations thereof.

7. The method of claim 1, wherein the diblock copolymer constitutes about 15.0% by weight or less of the sealant material, based on the entire weight of the sealant material.

8. The method of claim 1, and further comprising combining microspheres with the mineral oil and the diblock copolymer.

9. The method of claim 1, wherein the sealant material exhibits a blue tint when substantially free of coloring agents.

10. The method of claim 1, wherein the sealant material exhibits substantially no slumping when exposed to a temperature of about 80° C. for a one hour period.

11. The method of claim 1, wherein the sealant material comprises a gel material.

12. A method of making a sealant material, the method comprising:
providing a styrene-rubber diblock copolymer;
filtering the styrene-rubber diblock copolymer to provide a filtered styrene-rubber diblock copolymer having an average particle size of about one millimeter or less;
immersing the filtered styrene-rubber diblock copolymer in mineral oil at a processing temperature maintained at about 80° C. or less; and
mixing the filtered styrene-rubber diblock copolymer and the mineral oil without the addition of water or volatile solvents, wherein the mineral oil absorbs into the rubber portions of the diblock copolymer and comprises an amount of at least 50% by weight, and wherein the resulting sealant material is substantially free of petroleum wax, water, and volatile solvents.

13. The method of claim 12, wherein the processing temperature is about 50° C. or less.

14. The method of claim 12, wherein the processing temperature is about 30° C. or less.

15. The method of claim 12, wherein the sealant material exhibits a blue tint when substantially free of coloring agents.

16. The method of claim 12, wherein the sealant material comprises a gel material.

17. The method of claim 1, wherein the mineral oil comprises an amount between at least 50% by weight mineral oil and about 96% by weight mineral oil.

* * * * *